Aug. 13, 1946.   J. S. BEGGS ET AL   2,405,731
VARIABLE CIRCLE FOR STADIAMETRIC RANGE FINDERS
Filed Dec. 17, 1943

JOSEPH S. BEGGS
DANIEL B. McRAE
JOHN H. EAGLE
INVENTORS

BY
ATTORNEYS

Patented Aug. 13, 1946

2,405,731

UNITED STATES PATENT OFFICE 2,405,731

VARIABLE CIRCLE FOR STADIAMETRIC RANGE FINDERS

Joseph S. Beggs, Schenectady, and Daniel B. McRae and John H. Eagle, Rochester, N. Y., assignors to Eastman Kodak Company, Rochester, N. Y., a corporation of New Jersey Application December 17, 1943, Serial No. 514,640

3 Claims. (Cl. 88—2.3)

The present invention relates to a device for forming an apparent light circle from a point or small light source. The light source itself, or the image thereof, is mechanically or optically rotated at a speed such that the light point appears, due to the persistence of vision, as a continuous and unbroken circle of light.

Such a light circle is admirably adapted for use in connecting with a sighting device, such as a stadiametric range finder, for use on aeroplanes for determining the range of a target, such for example, as an opposing or enemy aeroplane. In order to effectively use a light circle as a stadiametric range finder, the size of the object being sighted upon must first be known. In other words, the observer must first ascertain the type of plane being sighted, and must know the general overall dimensions of this particular plane. As is well known, however, the size of an aeroplane is substantially constant irrespective of its orientation. On this basis, an aeroplane of known size and type and spaced a certain distance may be enclosed in a circle, such as shown in Fig. 6, and the diameter of the circle will then be a direct indication of the range or distance to the target. Obviously, if the distance to the target changes, the size of the circle necessary to enclose the target must, of necessity, also change or vary. However, whenever the circle is properly adjusted to just enclose the target, the range may be readily ascertained, knowing of course, the size of the target being sighted upon. In this way, the variable light circle may be employed as a stadiametric range finder to determine the distance to the target.

In the present invention, a circle of light is formed by rotating a point or small source of light at a speed such that the point appears as a continuous and unbroken circle. This light circle is then reflected or otherwise superimposed on the field of view of the sighting device. The size of the circle is then varied to just include the object being sighted, and the size of the circle is then utilized to determine the range, the type and size of the target, of course, being known to the observer. While such a variable light circle is shown in connection with a sighting or viewing device, this is by way of illustration only, as it is contemplated that such a variable circle has a wide range of other applications. The present invention is, therefore, to be limited only insofar as necessitated by the prior art and the scope of the appended claims.

The invention has as its principal object, the formation of a variable light circle by mechanically or optically rotating a point of light at a speed such that the point appears, due to the persistence of vision, as a continuous and unbroken circle which is then superimposed upon the field of view of the sighting device.

A further object of the invention is the provision of optical or mechanical means for moving the light source, or an image of the source, to vary the size of the circle formed by the rotating light point.

Another object of the invention is the provision of a device for forming a variable light circle which is highly effective, easily and quickly adjusted, and positive in its results.

To these and other ends, the invention resides in certain improvements and combinations of parts, all as will be hereinafter more fully described, the novel features being pointed out in the claims at the end of the specification.

In the drawing.

Similar reference numerals throughout the various views indicate the same parts.

Figure 1:
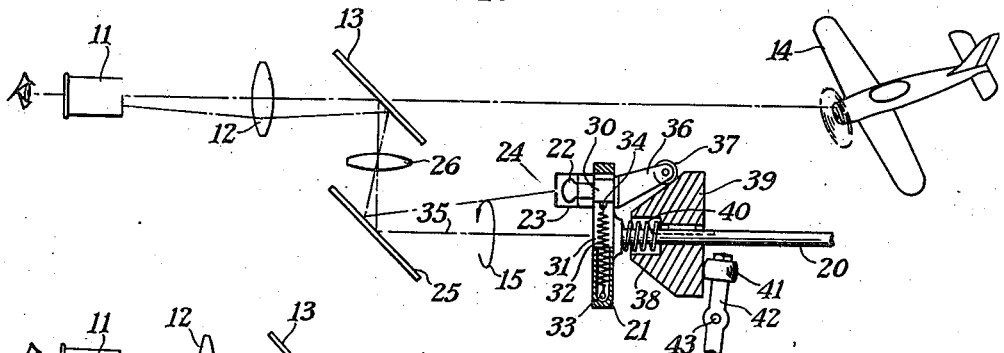
Fig. 1 is a diagrammatic arrangement of a sighting device showing the application thereto of an apparatus for forming a light circle from a point of light and constructed in accordance with the present invention.

The present invention is shown, for purposes of illustration only, in connection with a sighting device of a fire control apparatus. Such an illustration is not intended as a limitation as the circle-forming device of the present invention is suited to a wide variety of uses. Fig. 1 shows one form of a sighting device which comprises an eye-piece 11, a lens 12, and a semireflecting mirror 13, all of which may be enclosed in a suitable housing not shown. Upon sighting through the eye-piece, as illustrated in Fig. 1, a target such, as an aeroplane 14, may appear in the field of view, as is apparent. With the structure so far described, the observer can see the target 14, but has no means of determining the distance or range thereto. All that the observer knows is the type and size of plane being observed. However, if the span or width of the image of the aeroplane in the field of view were also known, the sighting device could then be employed as a stadiametric range finder, and the distance to the target could be readily ascertained.

Figure 6:
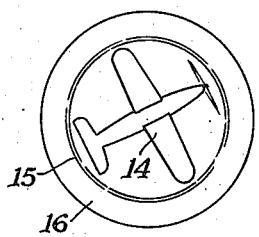
Fig. 6 is a view of the light circle showing the relation thereto of the target sighted upon.

To secure this result, the present invention provides an adjustable or variable circle of light 15 adapted to be positioned in the field of view 16 of the sighting device. This circle can be used to determine the range. The circle itself is formed by rapidly rotating a small point or a small light source at a speed such that the point of light appears, due to the persistence of vision, as a continuous unbroken circle. This light circle 15 may then be reflected or otherwise superimposed on the field of view 16 so that both the circle 15 and the target 14 are viewable as a unit, as clearly shown in Fig. 6. The size or diameter of the circle is then adjusted in a manner to be later described, until the target is just enclosed in the circle, as illustrated in Fig. 6. The adjusting of the circle diameter may be utilized to position various mechanisms, not shown, to indicate the correct range, and to adjust or position suitable fire-control apparatus.

Fig. 1 shows one mechanism for forming the desired circle of light and this mechanism comprises a shaft 20 connected to a suitable source of power, not shown, by which the shaft may be rotated at the proper speed. The shaft 20 has mounted thereon a radially extending arm 21 carrying a light source, such as a lamp 22, enclosed in a suitable housing 23. The latter is provided with a small opening or aperture 24 through which a light ray from the lamp 22 may pass to provide a small or point primary source of light. It is now apparent that if the shaft 22 is rotated at the proper speed, the light aperture 24 will appear, due to persistence of vision, as the continuous unbroken circle of light 15, see Fig. 6. A mirror 25 is positioned in the path of this light circle, and reflects the latter through a lens 26 onto the semitransparent reflecting mirror 13 so that the light circle 15 will be superimposed upon the field of view of the sighting device and is simultaneously viewed with the target 14.

Any variation in the distance between the observer and the target 14 will necessitate a change in the size of the circle 15 to give the proper range. Thus, as the target 14 approaches the observer, the target appears larger and the size of the circle must be increased, while the movement of the target away from the observer, renders the image of the target smaller so that the circle must be reduced in size. By thus varying the size of the circle 15, to just enclose the target 14, as shown in Fig. 6, the size of the circle will constitute a stadiametric range finder by which the distance to the target may be determined.

The size of the circle 15 may be varied or changed by varying the radial position of the primary light source 24. To secure this result, the lamp 22 and the housing 23 are mounted on a block 30 slidable in a radially formed guideway 31 in the arm 21. A spring 32 has one end 33 anchored to the arm 21 and the opposite end 34 secured to the block 30, and tends to move the latter and the light point 24 toward the axis of rotation 35 of the shaft 20. The block 30 also carries an arm 36 the end of which is provided with a roller 37 adapted to engage an inclined face 38 of an adjusting member 39 splined on the shaft 20. A spring 40 tends to move the member 29 to the right.

It will now be apparent from inspection of Fig. 1 that if the member 39 is moved to the left, against the action of the spring 40, the roller will ride up along the face 38 to move the lamp 22, housing 23, and light aperture 24 outwardly to thus increase the distance from the shaft 20 to the light point 24. On the other hand, if the member 39 is allowed to move to the right, under the axis spring 40, the light point 24 will approach the axis of the shaft 20. By thus moving the member 39, the radial position of the light point 24 may be moved or shifted to vary the diameter of the light circle caused by rapidly rotating the point 24, as is apparent. While the spring 40 serves to move the member 39 to the right, it is moved to the left by means of a roller 41 carried on an arm 42 pivoted at 43, as clearly shown in Fig. 1.

By means of the above-described arrangement, the light circle is formed by rapidly rotating a single point or primary source of light mechanically at a speed such that the light point appears as a continuous circle. The diameter of the circle is then varied by readily moving the light source itself radially of the drive shaft 20.

Figure 2:
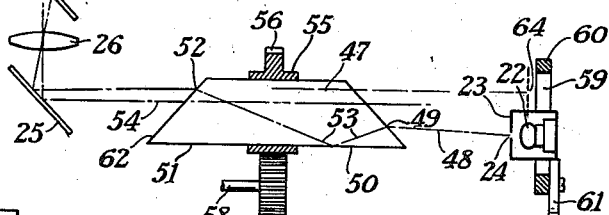
Fig. 2 is a view similar to Fig. 1 but showing another method of forming a light circle from a light point.

Fig. 2 shows a modified arrangement in which the light circle is formed by rotating a suitable optical member positioned in the path of a non-rotatable primary point light source. Parts corresponding to Fig. 1 are designated by the same numerals. The optical member in this embodiment comprises an image-inverting prism 47 so positioned that the beam of light 48 coming from the aperture 24 will enter the prism at point 49 and will then be reflected at 50 from the lower face 51 and will emerge at point 52, as shown by the line 53. The arrangement is such that the prism 47 forms a virtual image of the primary light source 24 at 64 in horizontal alignment with the point 52. It is now apparent that if the prism 47 is rotated at the proper speed about the axis 54, the virtual image 64 will rotate so that the point of light 52 will appear as a continuous circle. Thus a rotatable optical member 47 and a virtual image of non-rotatable primary light source 24 are used to form the light circle. The light rays from the latter are reflected by the mirror 25 through the lens 26 onto the semitransparent mirror 13, as described in connection with Fig. 1. The prism 50 is mounted in a suitable support 55 which carries a pinion 56 meshing with a gear 57 supported on a shaft 58 connected to a suitable source of power, not shown. The rotation of the shaft 58 is transmitted through the gears 57 and 56 to rotate the prism, as is apparent.

In order to vary the size and diameter of the light circle 15, the primary light source 24 is moved radially of the axis 54 to vary the relation of the virtual image 64 thereto. To secure this result, the housing 23 is slidably supported in a slot 59 formed in a bracket 60. A cam 61 is connected to a suitable adjusting mechanism, not shown, so that rotation of the cam serves to move the light point 24 radially towards or away from the axis 54 to vary the size of the light circle formed on the left face 62 of the prism 47, as will be readily apparent from an inspection of Fig. 2.

Figure 3:
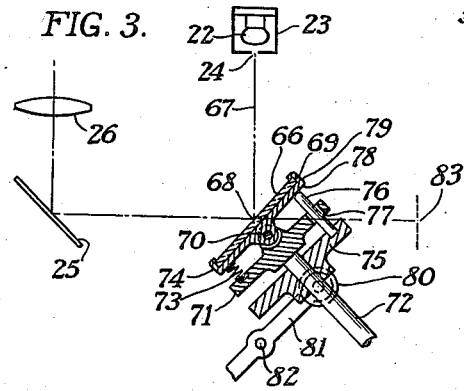
Fig. 3 shows an arrangement in which a stationary light source is utilized in the formation of a light circle, variations in the size of the circle being secured by adjusting the position of an optical member.

Fig. 3 shows a still further modification in which the formation and variation of the light circle is provided entirely by a single tiltable or adjustable optical member in the form of a mirror 66. In this embodiment, the primary light source 24 is stationary, and is arranged so that with the mirror 66 in its minimum position of adjustment, the rays 67 from the light source 24 will strike the mirror at its mid-point 68 to form a virtual image of the primary light source at 83, as clearly illustrated in Fig. 3. As also shown in this figure, the mirror 66 is inclined to the beam 67. It is apparent that if the mirror 66 is tilted or cocked, the rays 67 and the virtual image 83 will no longer be incident at the point 68 but will be displaced radially therefrom, the amount of such displacement depending on the amount of tilting of the mirror. It is also apparent that if the tilted mirror is now rotated at the proper speed, the virtual image 86 will appear as a continuous circle of light. This circle may then be reflected by the mirror 25 and the lens 26 to the semitransparent mirror 13, as mentioned above.

In order that the mirror 66 may be effective in both forming and varying the light circle, the mirror is mounted in a suitable support 69 pivoted at its mid-point 70 to a plate 71 carried by a drive shaft 72 which, when rotated, rotates the mirror 66 as a unit therewith, as is apparent. A spring 73 is positioned between one edge 74 of the support 69 and the plate 71 and tends to tilt the support 69 and mirror 66 in a counterclockwise direction about the pivot 70. A collar 75 is slidably mounted on the shaft 72 and carries an axially extending pin 76 which projects through an opening 77 formed in the plate 71 and engages the rear face 78 of the support 69 adjacent the opposite edge 79 thereof.

It will now be apparent from an inspection of Fig. 3 that if the collar 75 is moved upwardly or towards the plate 69, the pin 76 will cause the mirror 66 to tilt in a counterclockwise direction about its pivot 70. Such movement will move the virtual image 83 radially or off center, the amount of such decentering depending, of course, upon how much the mirror has been tilted. With the image 83 thus decentered, the rotation of the mirror 66 by shaft 72 will cause the virtual image 83 to appear as a continuous circle of light, the size of the circle depending on the amount of decentering of the image 83. If, however, the collar 75 is moved downwardly or to the right the mirror 66 would tilt in a clockwise direction so that the virtual image 83 will move radially toward the point 68 to decrease the size of the light circle. As mentioned above, the mirror 66 and support 69 are tilted by the axial movement of the collar 75 which, in turn, is moved by a roller 80 secured to the end of an operating member 81 pivoted at 82. Thus by moving the member 81 the mirror may be tilted to vary the tilting or inclination of the mirror 66 to thus alter or change the size of the reflected light circle. The latter, after formation by the tiltable rotating mirror 66, is reflected by the mirror 25 through the lens 26 into the field of view.

Figure 4:
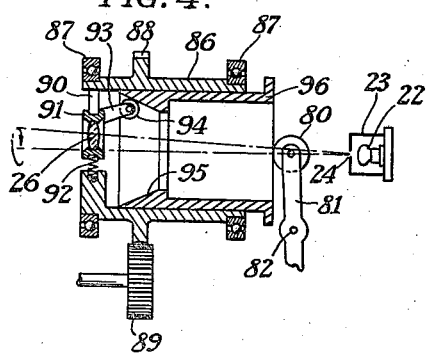
Fig. 4 is still another embodiment in which a rotating optical member forms a light circle from a stationary light source, the size of the circle being varied by the adjustment of the optical member.

Fig. 4 shows an arrangement in which the light circle is formed by means of a small stationary primary light source and a rotating real image formed by a rotating decentered optical member such as a lens. To secure this result, the lens 26 is positioned directly in the path of the light rays from the primary light source 24 and is mounted for rotation and radial adjustment so that the amount of decentering of the lens may be varied. In this modification, the mirror 25 is omitted and the light circle is projected directly onto the semitransparent mirror 13. To this end, the primary light source 24 is stationary and the lens 25 is mounted in a frame 86 supported by ball-bearings 87 and carrying a ring gear 88 meshing with a drive gear 89 connected to a suitable source of power not shown. The front of the frame 86 is formed with a radial guideway 90 adapted to receive a ring 91 carrying the lens 26. A spring 92 positioned below the ring 91 tends to move the latter and the lens 25 upwardly, as viewed in Fig. 4, to decenter the lens. The ring 91 is provided with a rearwardly projecting arm 93 carrying a roller 94 which rides on an inclined surface or cam 95 formed on an annular control member 96 slidably mounted in frame 86.

It will now be apparent from an inspection of Fig. 4 that if the control member 96 is slid to the left, the ring 91 will be moved downwardly against the action of the spring 92 to radially move the lens and the real image formed thereby toward the axis of the aperture 24. On the other hand, rightward movement of the control member 96 will permit the spring 92 to function to move the lens and the real image formed thereby upwardly, as viewed in Fig. 4. By means of this arrangement, the lens may be moved radially to decenter the lens to thus change the position of the real image of the primary light source 24, the amount of decentering depending on the amount of movement of the control member 96. Furthermore, by changing the amount of such decentering, the radial position of the real image of 24 will be varied to alter the diameter of the light circle formed, as will be apparent. Thus a real image of a rotating decentered lens is utilized to form the light circle, and changes in the radial portion of the lens alters the radial portion of the real image of the primary light source 24 formed thereby to vary the size of the resulting light circle.

Figure 5:
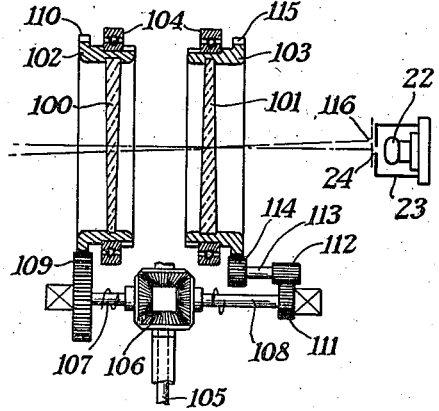
Fig. 5 is still another modification which shows the use of optical members for forming a light circle of a stationary light source. Relative movement of the optical members serves to vary the size of the light circle.

In the arrangement shown in Fig. 5, the light circle is formed by means of a pair of rotating optical wedges 100 and 101 which form a virtual image 116 of the primary light source 24 adjacent the latter, and the size of the circle is varied by varying the relative angular position and hence the power of the wedges to change the radial position of the virtual image 116. In this case, the lamp 22 and the housing 23 are stationary to provide a stationary primary light source 24. The wedges 100 and 101 are arranged in the path of the light rays from the primary light source 24 and are carried by suitable frames 102 and 103 respectively, each rotatably supported on ball-bearings 104. A drive shaft 105 has one end connected to a source of power, not shown, and the other end connected through a differential 106 to a pair of auxiliary drive shafts 107 and 108 respectively. The shaft 107 carries a gear 109 which meshes with a gear 110 on the frame 102, while the shaft 108 has mounted thereon a gear 111 meshing with a gear 112 on a stub-shaft 113. The latter also carries a pinion 114 which meshes with and drives a ring gear 115 on the frame 103.

By means of the above-described construction, the two wedges 100 and 101 may be driven at the same angular speed and at the required rate to cause the virtual image 116 of the primary light source 24 to appear as a continuous circle of light. The latter is then reflected, as mentioned above, by means of the mirror 25 and the lens 26 to the semitransparent mirror 13. In order to vary the size of the light circle formed, it is necessary to vary or change the relative angular positions and hence the power of the two wedges 100 and 101 to thus alter the radial position of the virtual image 116. This may be secured by pivoting or moving the drive shaft 105 about the axis of the shafts 107 and 108. Such movement of the shaft 105 will cause the differential 110 to impart a momentary relative rotative movement to the shafts 107 and 108 to vary the relative angular positions of the wedges 100 and 101. After the shaft 105 has been moved to its new position it will remain in such position and the wedges will then rotate at the same angular speed but will have been moved relative to each other due to the adjustment of the shaft 105.

Thus the various drive members normally tend to drive or rotate the two wedges 100 and 101 at the same angular speed to provide a light circle of one diameter, but a tilting or rotative movement of the shaft 105 about the axis of the shafts 107 and 108 will cause a momentary relative movement between the latter shafts to adjust the angular relation of the wedges and hence the virtual image 116 to vary or change the size of the light circle formed thereby. Thus rotating and adjustable optical members are adapted to form a variable light circle from a small stationary light source.

It is apparent from the above description, that the present invention provides an arrangement for forming a light circle from a single small primary source of light or a secondary light source which is either a real or a virtual image of the primary light source, and by so rotating the light source, either primary or secondary, at a speed such that the light source, due to persistence of vision, appears as a continuous unbroken circle. Furthermore, the size or diameter of the light circle thus formed may be varied by a mechanical or optical device which readily moves the light itself or real or virtual image thereof. The term "light," "light source," or "point of light" found in the claims is used in a generic sense to include either the primary source 24 or the secondary source which is a real or virtual image of the primary source 24.

While such a variable light circle has been shown in connection with a sighting or aiming device, the present invention is not limited thereto, as it is contemplated that such a variable light circle will have a wide range of applications. The present invention is therefore to be limited only insofar as necessitated by the prior art and the scope of the appended claims.

We claim:

1. A device for forming a light circle comprising, in combination, an inverting prism adapted to be rotated about an axis passing through said prism and substantially parallel to one side thereof, a light source for directing a small beam of light toward said prism and in the direction of said axis but eccentric thereto so as to be incident on said prism at a point off said axis so that said prism will form an off-axis image of said beam, means for rotating said prism at a rate such that said image will appear as a continuous circle, and means for moving said light source to vary the off-axis relation of said beam to vary the size of said circle.

2. A device for forming a light circle comprising, in combination, a dove prism adapted to be rotated about an axis passing through said prism and substantially parallel to the base of said prism, an adjustable light source adapted to direct a stationary beam of light toward said prism so as to be incident thereon eccentrically of said axis so that said prism will form an off-axis image of said beam, means for rotating said prism about said axis to cause said image to appear as a continuous circle of light, and means for adjusting said light source radially of said axis to alter the off-axis relation of the point of incidence of said beam on said prism to vary the size of said circle.

3. A device for forming a light circle comprising, in combination, a dove prism adapted to be rotated about an axis passing through said prism and substantially parallel to the base thereof, an adjustable light source positioned off said axis and adjusted to direct a stationary beam of light toward said prism and substantially parallel to said axis so as to be incident on said prism eccentrically of said axis so that said prism will form an off-axis image of said beam, means for rotating said prism about said axis to cause said image to appear as a continuous circle, and means for adjusting said light source radially of said axis to vary the off-axis relation of said image to alter the size of said circle.

JOSEPH S. BEGGS.
DANIEL B. McRAE.
JOHN H. EAGLE.